(12) United States Patent
Nonaka

(10) Patent No.: US 7,123,949 B2
(45) Date of Patent: Oct. 17, 2006

(54) FOLDABLE PORTABLE TERMINAL

(75) Inventor: Keisuke Nonaka, Daito (JP)

(73) Assignees: Sanyo Electric Co., Ltd., Moriguchi (JP); Sanyo Telecommunications Co., Ltd., Daito (JP)

( * ) Notice: Subject to any disclaimer, the term of this patent is extended or adjusted under 35 U.S.C. 154(b) by 80 days.

(21) Appl. No.: 10/475,858

(22) PCT Filed: May 7, 2002

(86) PCT No.: PCT/JP02/04443

§ 371 (c)(1),
(2), (4) Date: Nov. 3, 2003

(87) PCT Pub. No.: WO02/090785

PCT Pub. Date: Nov. 14, 2002

(65) Prior Publication Data

US 2004/0127269 A1 Jul. 1, 2004

(30) Foreign Application Priority Data

May 9, 2001 (JP) .............................. 2001-138188

(51) Int. Cl.
*H04M 1/00* (2006.01)
(52) U.S. Cl. ................ 455/575.3; 455/575.1; 379/428; 12/341
(58) Field of Classification Search ............ 455/575.3, 455/575.1; 379/428; 12/341
See application file for complete search history.

(56) References Cited

U.S. PATENT DOCUMENTS

| 5,697,124 A | * | 12/1997 | Jung ........................... 16/341 |
| 5,995,373 A | * | 11/1999 | Nagai ......................... 361/755 |
| 6,708,046 B1 | * | 3/2004 | Takagi ..................... 455/575.3 |
| 2001/0034242 A1 | * | 10/2001 | Takagi ......................... 455/550 |

FOREIGN PATENT DOCUMENTS

| JP | 2001-32821 | 2/2001 |
| JP | 2002-64599 | 2/2002 |
| JP | 2002-139024 | 5/2002 |

OTHER PUBLICATIONS

Cover page of EP 1148693 A2, published Oct. 24, 2001/Cited in the International Search Report/Related to US 2001/0034242 A1.

* cited by examiner

*Primary Examiner*—Joseph Feild
*Assistant Examiner*—Pierre-Louis Desir
(74) *Attorney, Agent, or Firm*—Armstrong, Kratz, Quintos, Hanson & Brooks, LLP.

(57) ABSTRACT

In a cellular phone, a first cabinet and a second cabinet are foldably connected by a hinge, and the two cabinets are electrically connected by a connection member arranged inside the hinge portion. The hinge portion is constituted by putting together a first fitting portion provided at a first inner case, and a second fitting portion provided at a second inner case. A cut-out for inserting the connection member is provided between the two fitting portions. The cut-out is covered by a first tongue piece that is attached to the first fitting portion, and a second tongue piece that is attached to a second outer cover.

4 Claims, 8 Drawing Sheets

FOLDABLE PORTABLE TERMINAL

TECHNICAL FIELD

The present invention relates to portable terminals, particularly to cellular phones with foldable constructions.

BACKGROUND ART

FIG. 13 is a perspective view of a cellular phone with a conventional folding structure, and FIG. 14 is a perspective view of the conventional cellular phone folded, as viewed from the rear side. The cellular phone is configured with a hinge (5) foldably connecting a first cabinet (9), which is provided with a display panel (91) that displays information, and a second cabinet (90), which is provided with operation keys (92). (See Japanese Patent No. 3093727.)

The first cabinet (9) is provided with a first inner case (1) in which the display panel (91) is installed, and a first outer cover (3) that covers the rear side of the first inner case (1). The second cabinet (90) is provided with a second inner case (2) in which the operation keys (92) are installed, and a second outer cover (4) that covers the rear side of the second inner case (2).

FIG. 8 is an exploded perspective view of the two conventional inner cases (1) and (2), and the two outer covers (3) and (4). The operation keys (92) are not shown in the figure, but the through-holes (93) into which the operation keys (92) are fitted are shown. An image control circuit (80) that changes the images of the display panel (91) is provided inside the first outer cover (3), and a system control circuit (81) that receives signals from the operation buttons (92) and issues signals to update the images in the image control circuit (80) is located inside the second outer cover (4). The image control circuit (80) and the system control circuit (81) are connected by a connection member (8) or a flexible substrate, electrical wiring or the like, and this connection member (8) is accommodated in the hinge portion (5).

FIG. 9 is an exploded perspective view of the conventional first and second inner cases (1) and (2), and FIG. 10 is a cross-sectional view through a vertical plane containing the F—F line in FIG. 9. Both inner cases (1) and (2), and both outer covers (3) and (4) are formed by injection molding of a synthetic resin. A first fitting portion (10) is provided at the end of the first inner case (1), and a second fitting portion (20) that fits into the first fitting portion (10) is provided at the end of the second inner case (2). The hinge portion (5) is constituted by the first fitting portion (10) and the second fitting portion (20).

The first fitting portion (10) is provided with a first tube structure (11), which is provided with a small aperture (14) that passes through the center of first tube structure (11), and spaced apart from a second tube structure (12) on the same line. The second fitting portion (20) is provided with a third tube structure (21) positioned on the outer side of the first tube structure (11), a first covering structure (23) positioned between the first tube structure (11) and the second tube structure (12), and a fourth tube structure (22) positioned on the outer side of the second tube structure (12). A second covering structure (13) is provided extending from the second tube structure (12) toward the first tube structure (11). The second covering structure (13) is substantially arc-shaped in profile (see FIG. 12), and is positioned in line with the first covering structure (23). The undersides of the first and second covering structures (23) and (13) are open.

Pivot shafts (51) are inserted from the outside of the third tube structure (21) and the fourth tube structure (22). Along the insertion directions of the two tube structures (21) and (22), the pivot shafts (51) are provided with a large-diameter portion (51a), a mid-size diameter portion (51b), and a small-diameter portion (51c).

As shown in FIG. 10, provided as openings in the third tube structure (21) and the fourth tube structure (22) are a large aperture (26), into which the large-diameter portion (51a) is fitted, and a mid-size diameter aperture (27), into which the mid-size diameter portion (51b) is fitted. The small-diameter portion (51c) fits into the small aperture (14) of the first tube structure (11) and the second tube structure (12).

The pivot shafts (51) pass through the large aperture (26) and the mid-size diameter aperture (27) of the third tube structure (21) and the first tube structure (11), and the fourth tube structure (22) and the second tube structure (12) from the outer sides of the second inner case (2), and by fitting stopper washers (52) at the tip of the small-diameter portions (51c) of the pivot shafts (51), both inner cases (1) and (2) are connected by the hinge (5).

FIG. 11 is a back side view of the two inner cases (1) and (2) of FIG. 8. The connection member (8) can pass underneath the first and second covering structures (23) and (13), which are shown shaded in FIG. 11. That is, the shaded portion forms a cut-out (50) of the hinge portion (5).

As shown in FIG. 8, a first protruding piece (35) protrudes from the bottom end of the first outer cover (3), and a second protruding piece (45) protrudes from the top end of the second outer cover (4). The first protruding piece (35) cover the lower part of the second covering structure (13), and the second protruding piece (45) covers the lower part of the first covering structure (23), thus forming an outer peripheral surface of the hinge portion (5), and accommodating the connection member (8) inside the hinge portion (5).

In the conventional structure, not only the two inner cases (1) and (2), but the first protruding piece (35) of the first outer cover (3), and the second protruding piece (45) of the second outer cover (4) constitute the outer peripheral surface of the hinge portion (5) (see FIG. 14). Consequently, lined up on the rear side of the hinge portion (5) are structural portions of the two inner cases (1) and (2), and the two outer cases (3) and (4). Conventionally, it has been usual to prevent the formation of a striped pattern by making the two inner cases (1) and (2), and the two outer cases (3) and (4) consistent with all being the same color.

However, in order to achieve design diversification and product differentiation, there is now a need for forming the two inner cases (1) and (2), and the outer covers (3) and (4) with different colors. With a conventional structure, attempting to form the inner cases (1) and (2) and the outer covers (3) and (4) with materials of different colors led to the deficiency of the hinge portion (5) being formed with a striped pattern. Specifically, if attempting to form the inner cases (1) and (2) in pink, and the outer covers (3) and (4) in white, the first protruding piece (35) and the second protruding piece (45) would be formed in white, and the first to fourth tube structures (11), (12), (21), and (22), as well as the first covering structure (23) and the second covering structure (13) would be formed in pink, and therefore the outer peripheral surface of the hinge portion (5) shown in FIG. 14 would become a striped pattern of white and pink, thus adversely affecting the attractiveness of the hinge portion (5) when viewed from the outside.

At this point, applying a color to the first protruding piece (35) and the second protruding piece (45) that is different from the color of the outer covers (3) and (4) is troublesome. Moreover, if applying a color to the first protruding piece (35) and the second protruding piece (45) with a coating or the like, there is the problem that the attractiveness becomes all the more adversely affected when the coating on the first protruding piece (35) and the second protruding piece (45) wears off, and their actual surfaces become exposed.

Also when the inner cases (1) and (2) and the outer covers (3) and (4) are formed with materials of different textures or patterns, there is the same problem of the hinge portion (5) becoming a striped pattern.

An object of the present invention is to provide a foldable portable terminal by which, even when the inner cases and the outer covers are formed with materials that have different visual qualities and feel, it is possible to make the hinge portion consistent with a material that has the same visual qualities and feel.

DISCLOSURE OF INVENTION

The hinge portion (5) of a first cabinet (9) and a second cabinet (90) of a portable terminal is constituted by putting together a first fitting portion (10) provided at a first inner case (1), and a second fitting portion (20) provided at a second inner case (2), and a cut-out (50) for inserting a connection member (8) is provided between the two fitting portions (10) and (20).

One of the fitting portions (10) is provided with a first tube structure (11) and a second tube structure (12), and a second covering structure (13) that is substantially arc-shaped in profile extends from the first tube structure (11) toward the second tube structure (12), and a back side of the second covering structure (13) is open.

The cut-out (50) is covered by a first tongue piece (6) that provides substantially a tube-shape when put together with the second covering structure (13), and a second tongue piece (7) that is attached to one of the outer covers (3) and (4).

The cut-out (50) into which the connection member (8) is inserted is provided as an opening at the hinge portion (5) of the first cabinet (9) and the second cabinet (90), but this cut-out (50) is covered by first and second tongue pieces (6) and (7), which are formed separately from the fitting portions (10) and (20), and the outer covers (3) and (4). Conventionally, the outer covers (3) and (4) constitute a part of the hinge portion (5), but in the present invention, since the first and second tongue pieces (6) and (7) can be formed with a material and color different from the outer covers (3) and (4), it is easy to form the hinge portion (5) consistently with a material that has the same visual qualities and feel, and there is no stripe pattern. Thus, the inner cases (1) and (2), and the outer cover (4) can be formed with materials that have different visual qualities and feel, enabling product differentiation.

BEST MODE FOR CARRYING OUT THE INVENTION

The following is a detailed description of an example of the present invention using the accompanying drawings.

A characteristic of the present invention is that the outer covers (3) and (4) are not part of the hinge portion (5).

Figure 1:
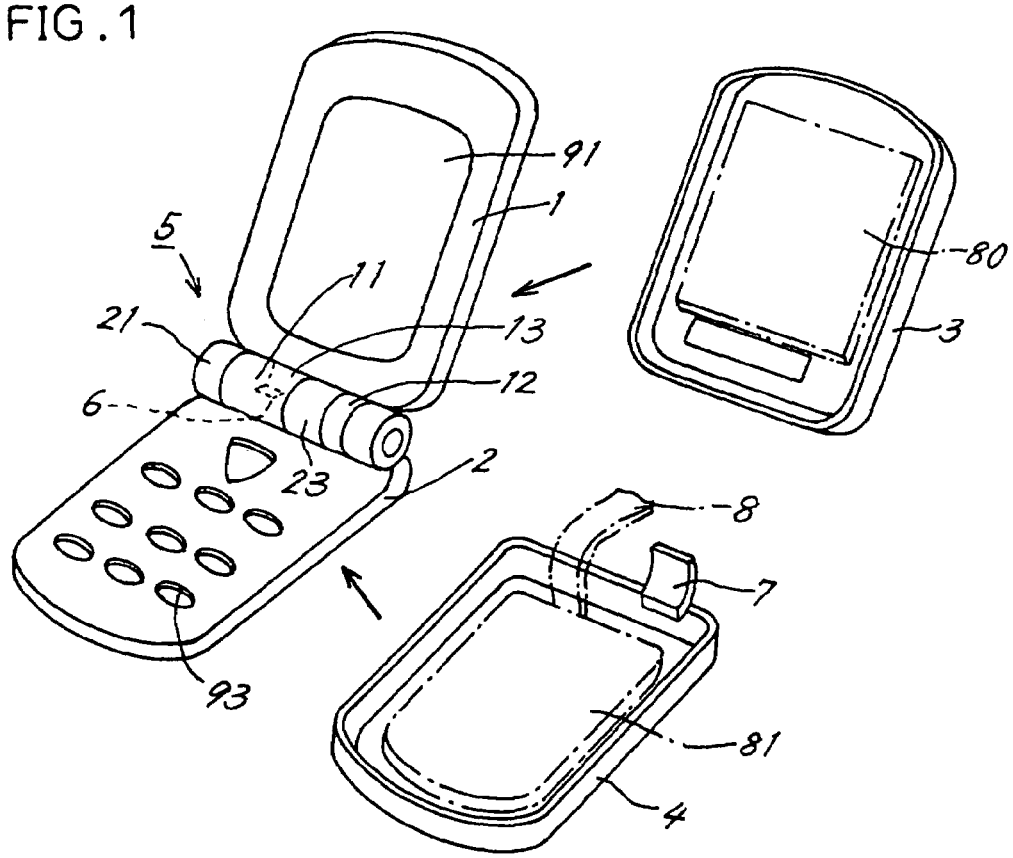
FIG. 1 is an exploded perspective view of a cellular phone according to the present invention.
Figure 7:
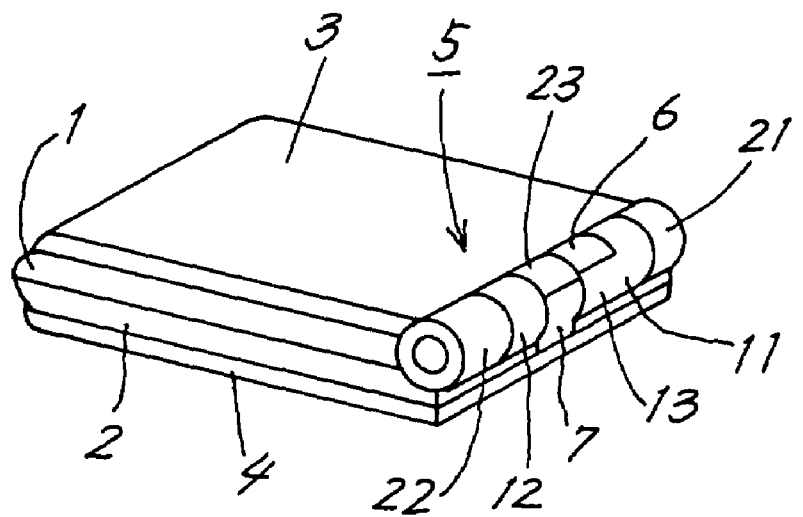
FIG. 7 is a perspective view of a cellular phone according to the present application when folded, viewed from the rear.
Figure 8:
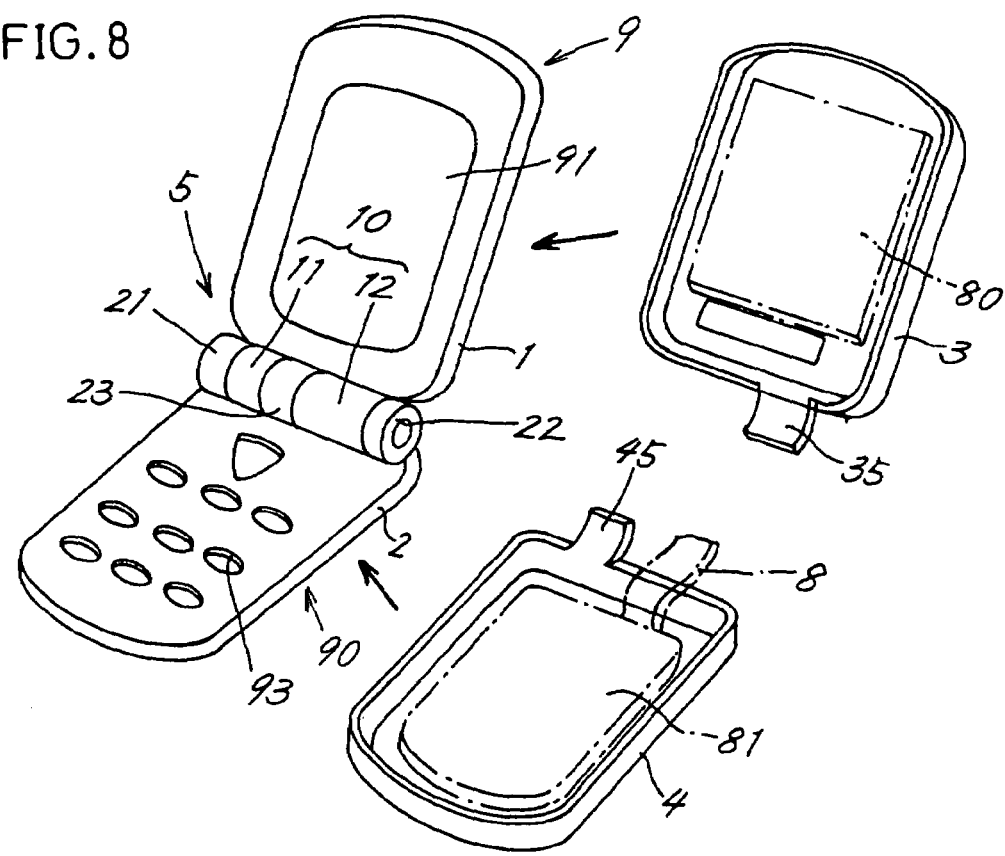
FIG. 8 is an exploded perspective view of conventional two inner cases and two outer covers.
Figure 9:
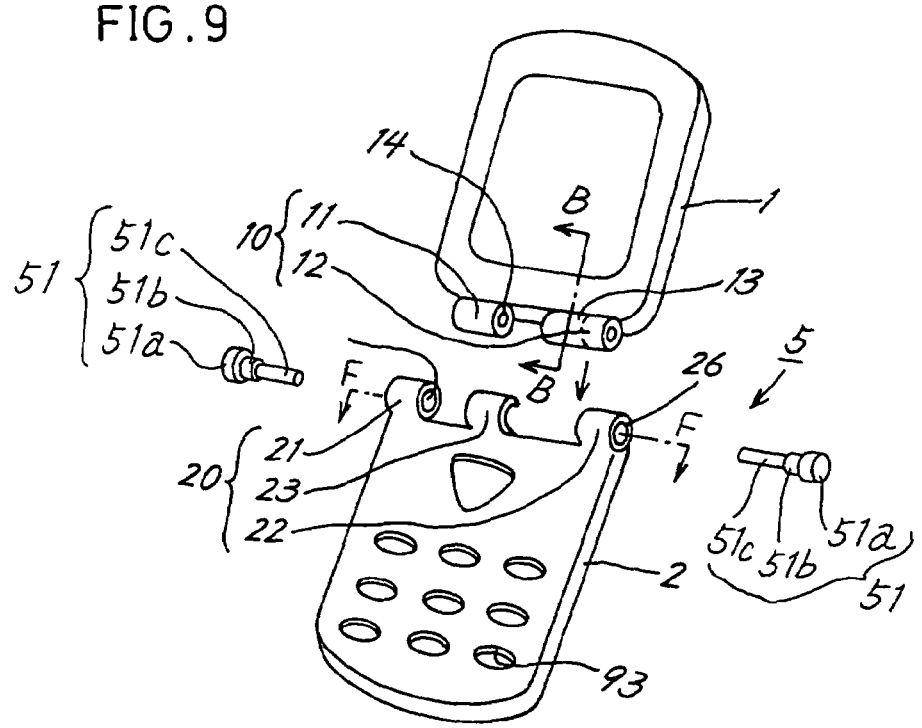
FIG. 9 is an exploded perspective view of conventional first and second inner cases.

FIG. 1 is an exploded perspective view of a cellular phone according to the present application, with operation buttons and the like omitted. Furthermore, FIG. 7 is a perspective view of a cellular phone according to the present application when folded, viewed from the rear. As in conventional cellular phones, also in this cellular phone, a hinge portion (5) foldably connects a first cabinet (9) and a second cabinet (90).

Figure 6:
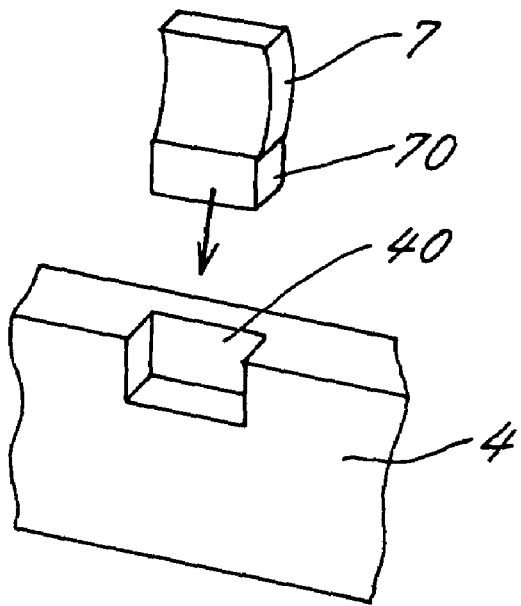
FIG. 6 is a perspective view showing how a second tongue piece is attached to a second outer cover.

The first cabinet (9) is provided with a first inner case (1) in which a display panel (91) is installed, and a first outer cover (3) that covers the rear side of the first inner case (1). The second cabinet (90) is provided with a second inner case (2), and a second outer cover (4) that covers the rear side of the second inner case (2). Attached to the second outer cover (4) is a second tongue piece (7), which is freely attachable/ removable and will be discussed later. Various structures are possible for attaching the second tongue piece (7) to the second outer cover (4), and as shown in FIG. 6 for example, it may be a structure in which a concave notch (40) is formed in the second outer cover (4), a press-in piece (70) that protrudes from the lower side of the second tongue piece (7) is pressed into the concave notch (40), and fastened by an adhesive or the like. In FIG. 1, the first outer cover (3) and the second outer cover (4) are not covered by the hinge portion (5), but the hinge portion (5) is covered only by the second tongue piece (7).

An image control circuit (80) that changes the images of the display panel (91) is provided inside the first outer cover (3), and a system control circuit (81) that receives signals from the operation buttons (92) and issues signals to update the images in the image control circuit (80) is arranged inside the second outer cover (4). The image control circuit (80) and the system control circuit (81) are connected by a connection member (8) of a flexible substrate, electrical wiring or the like, and the connection member (8) is accommodated in the hinge portion (5).

Figure 2:
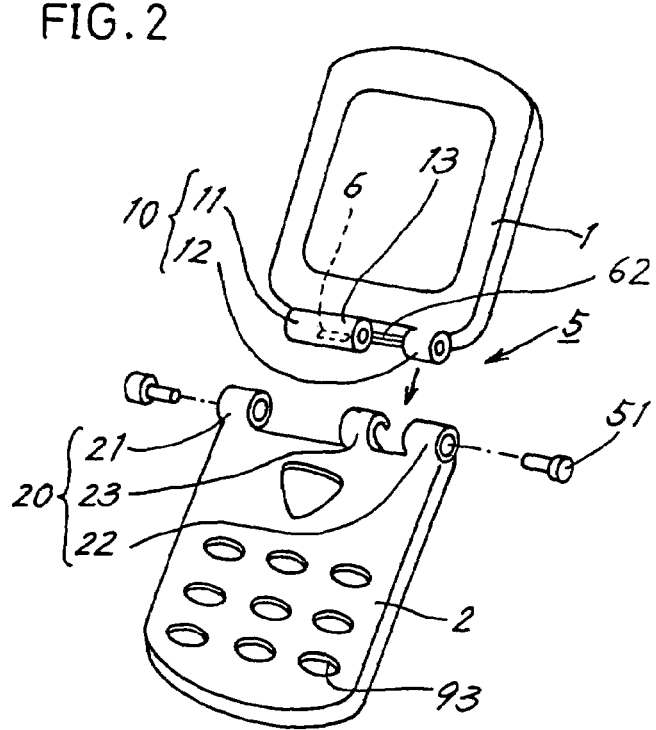
FIG. 2 is an exploded perspective view of the two inner cases.

FIG. 2 is an exploded perspective view of the two inner cases (1) and (2). A first fitting portion (10) is provided at the end of the first inner case (1), and a second fitting portion (20) that fits into the first fitting portion (10) is provided at the end of the second inner case (2). The hinge portion (5) is constituted by the first fitting portion (10) and the second fitting portion (20).

Figure 10:
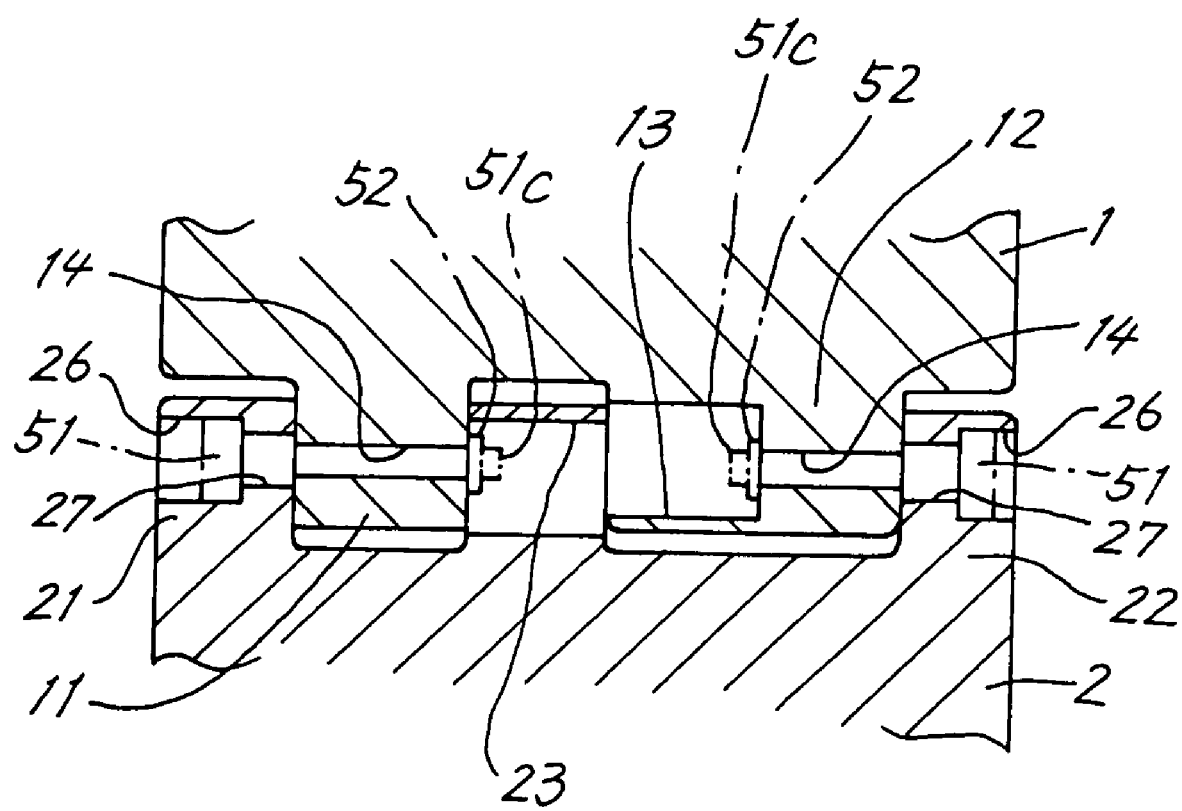
FIG. 10 is a cross-sectional view through a vertical plane containing the F—F line in FIG. 9.
Figure 11:
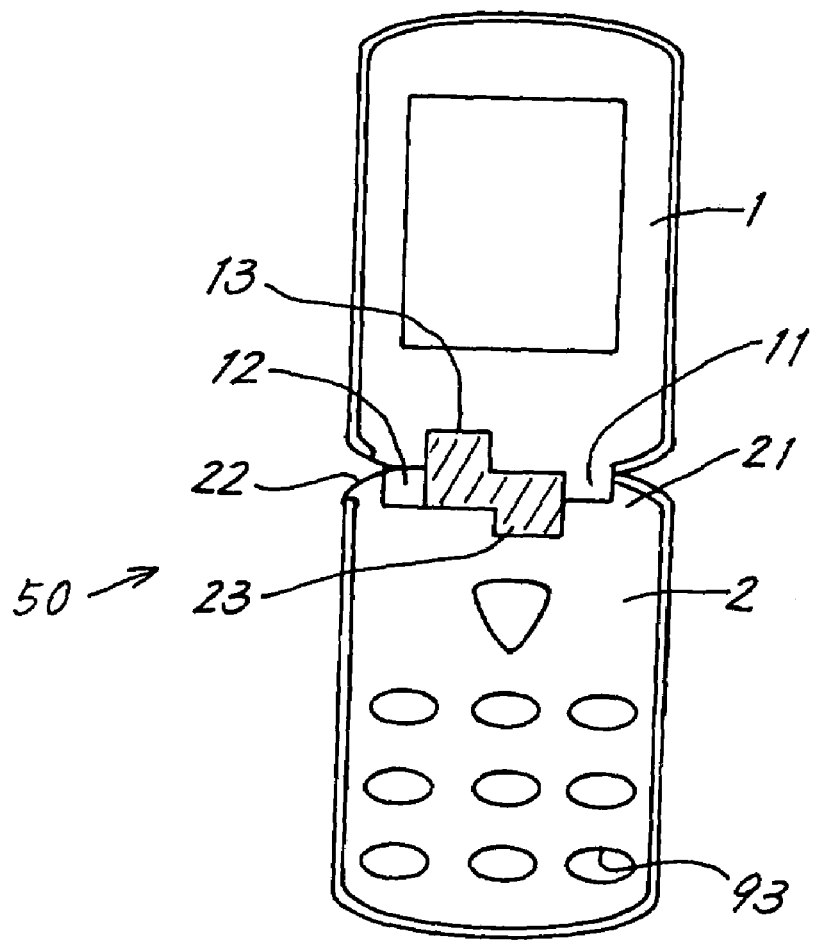
FIG. 11 is a back side view of both inner cases of FIG. 8.
Figure 12:
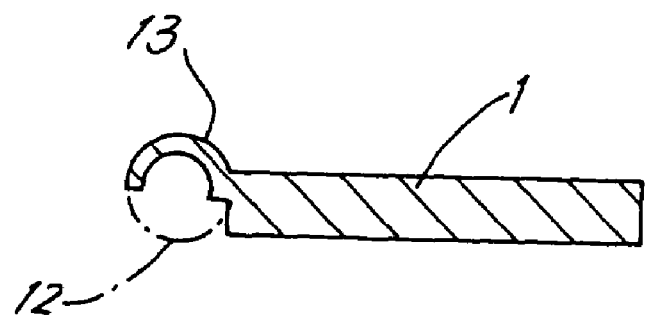
FIG. 12 is a cross-sectional view through a vertical plane containing the B—B line of FIG. 9.
Figure 13:
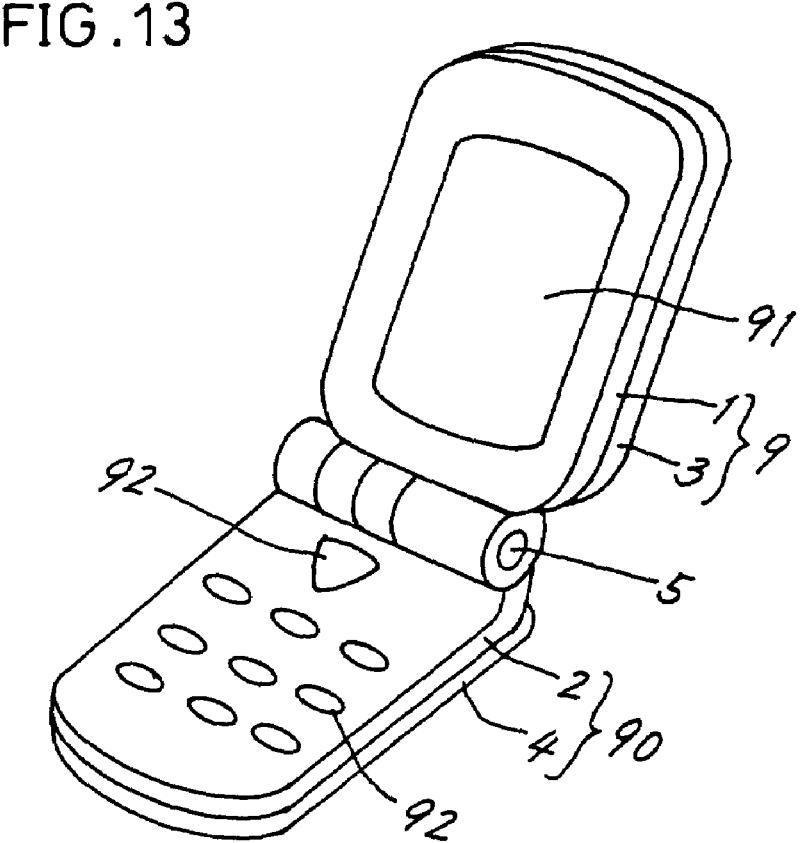
FIG. 13 is a perspective view of a conventional cellular phone.
Figure 14:
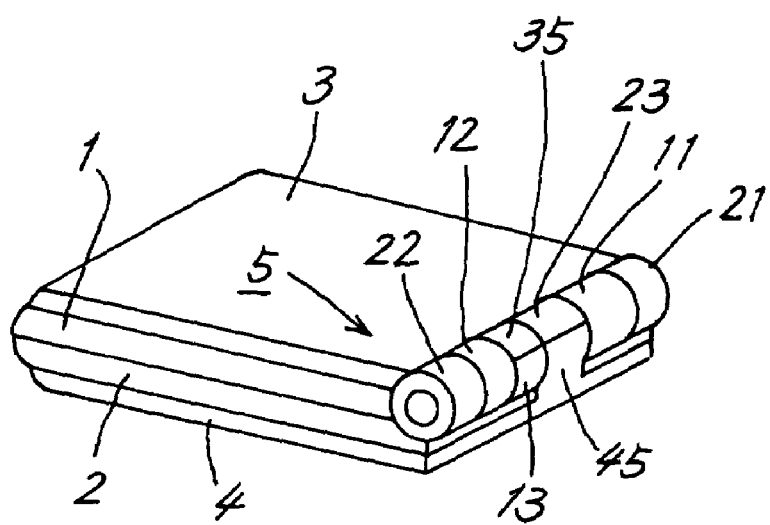
FIG. 14 is a perspective view of the conventional cellular phone when folded, viewed from the rear.

The first fitting portion (10) is provided with a first tube structure (11) and a second tube structure (12) that are spaced apart from each other and face sideways. The second fitting portion (20) is provided with a third tube structure (21) positioned on the outer side of the first tube structure (11), a first covering structure (23) that fits between the first tube structure (11) and the second tube structure (12), and a fourth tube structure (22) positioned on the outer side of the second tube structure (12). Pivot shafts (51) pass through and are fitted into the first tube structure (11) and the third tube structure (21), and the second tube structure (12) and the fourth tube structure (22) from both sides of the second inner case (2), and by fitting stopper washers (52) (see FIG. 10) at the tip of the pivot shafts (51), both inner cases (1) and (2) are hinge connected. This structure in which pivot shafts (51) pass through the third tube structure (21) and the first tube structure (11), and the fourth tube structure (22) and the second tube structure (12) is the same as the conventional structure shown in FIG. 10.

Figure 3:
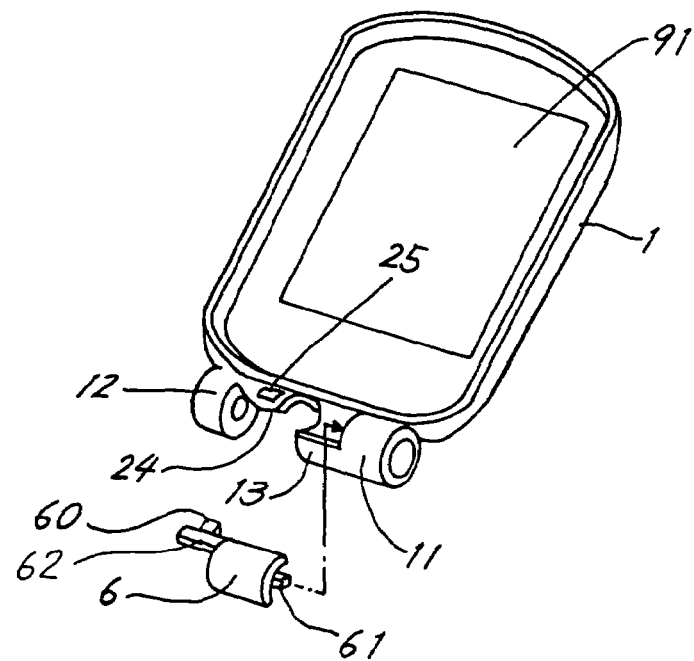
FIG. 3 is a perspective view of a first inner case viewed from the back.

As shown in FIGS. 2 and 3, a second covering structure (13), which is substantially arc-shaped in profile, extends from the first tube structure (11) toward the second tube structure (12), and the back side of the second covering structure (13) is open. The connection member (8) can be inserted from the back of the second covering structure (13).

FIG. 3 is a perspective view of the first inner case (1) viewed from the back. A receiving piece (24) is provided as a protrusion between the second tube structure (12) and the second covering structure (13), and a latch hole (25) is provided as an opening in the receiving piece (24).

A first tongue piece (6) that is arc-shaped in profile is attached to the second covering structure (13). The first tongue piece (6) has an arm piece (62) that protrudes laterally, and a positioning protrusion (61) that fits to the side of the first tube structure (11), and provided on the arm piece (62) facing the latch hole (25) is a claw piece (60) that catches onto the periphery of the latch hole (25) from underneath. The open portion at the back of the second covering structure (13) is covered by the first tongue piece (6). When the first tongue piece (6) is put together with the second covering structure (13), the first tongue piece (6) and the second covering structure (13) form a single, continuous tube structure. When the positioning protrusion (61) is fitted to a cut-out (not shown in drawing) at the side of the first tube structure (11), the first tongue piece (6) restricts inadvertent turning.

Figure 4:
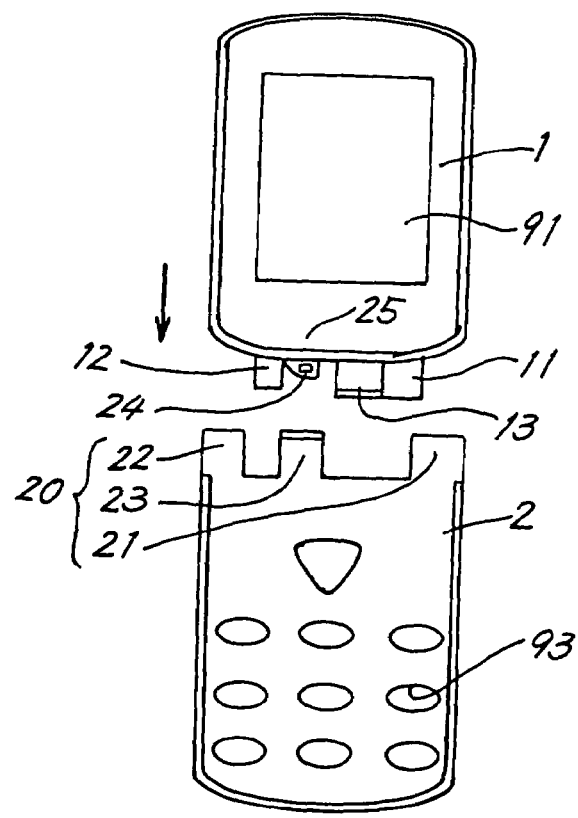
FIG. 4 is an exploded view of the two inner cases viewed from the back.
Figure 5:
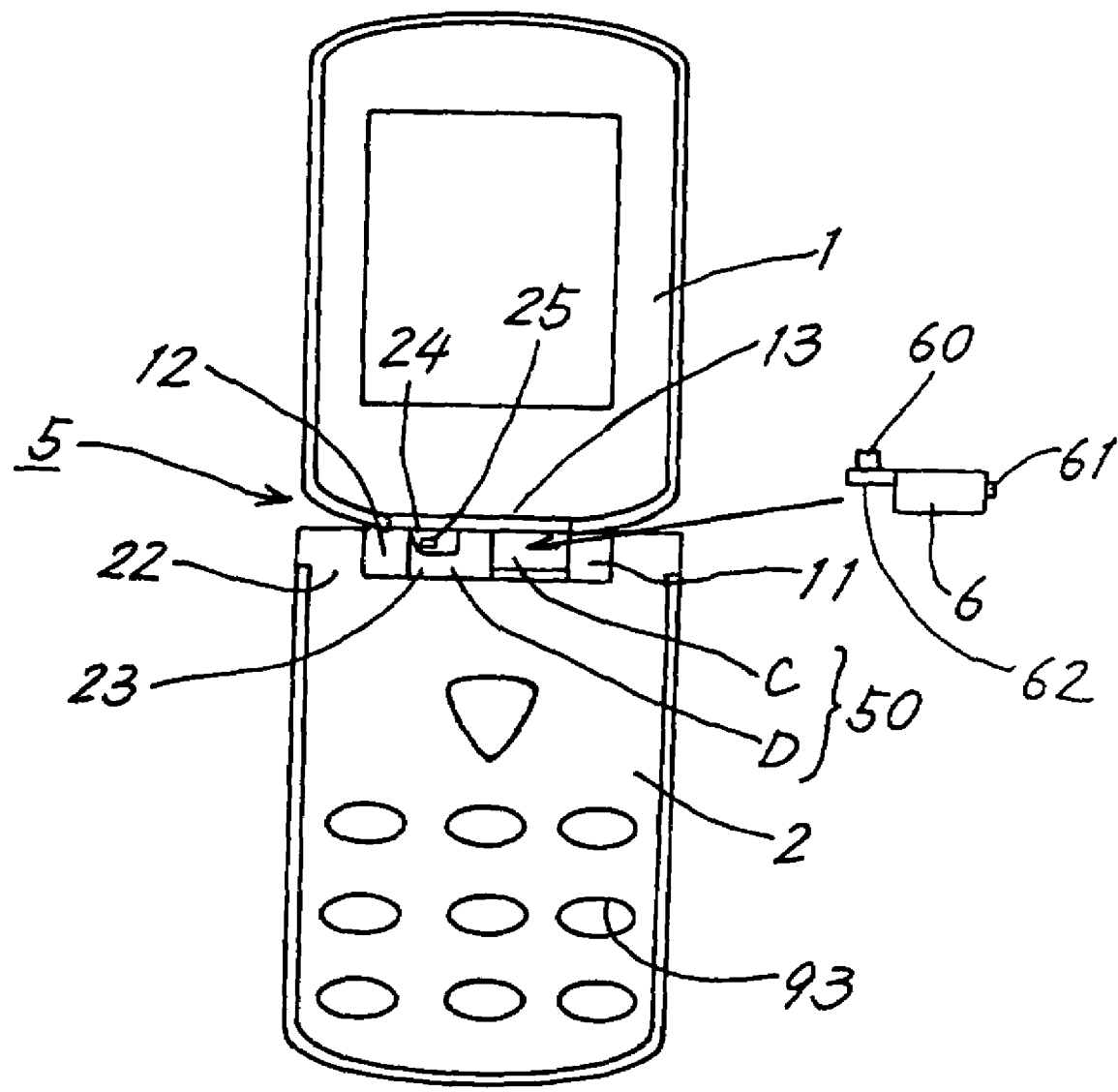
FIG. 5 shows the two inner cases in a linked state viewed from the back.

FIG. 4 is an exploded view of the two inner cases (1) and (2) viewed from the back, and FIG. 5 is a bottom view of the two inner cases (1) and (2) in a linked state viewed from the back. The first covering structure (23) is fitted between the second tube structure (12) and the second covering structure (13). As mentioned above, the pivot shafts (51) pass through and are fitted into the first tube structure (11) and the third tube structure (21), and the second tube structure (12) and the fourth tube structure (22) (see FIG. 2), thus the two inner cases (1) and (2) are rotatably linked.

As shown in FIG. 5, an back side D of the first covering structure (23), and a back side C of the second covering structure (13) are open, thus forming a cut-out (50) of the hinge portion (5).

Cellular Phone Assembly

To assemble the cellular phone, first, the two inner cases (1) and (2) are linked as shown in FIG. 5, then the outer covers (3) and (4) are attached to the two inner cases (1) and (2).

After inserting the connection member (8) into the second covering structure (13) from the cut-out (50), if the first tongue piece (6) is attached to the second covering structure (13) as described above, the connection member (8) at the back side C of the second covering structure (13) becomes concealed.

The second tongue piece (7) shown in FIG. 1, which is arc-shaped in profile, is put together with the back side D of the first covering structure (23). By putting the second tongue piece (7) together with the first covering structure (23) and the arm piece (62), a substantially tube-shaped external appearance is given, and the connection member (8) is covered. Thus, the outer peripheral surface of the hinge portion (5) is formed continuously.

The cut-out (50) is covered by the first tongue piece (6), which is formed separately from the second inner case (2), and the second tongue piece (7), which is formed separately from the second outer cover (4) (see FIG. 7). Conventionally, the outer covers (3) and (4) constitute a part of the hinge portion (5), but in the present invention, rather than being covered by the outer covers (3) and (4), the cut-out (50) is covered by the first and second tongue pieces (6) and (7). As the first and second tongue pieces (6) and (7) can be formed with a material different from the second outer cover (4), it is easy to form the hinge portion (5) consistently with a material that has the same visual qualities and feel, or more specifically, a material of the same color and pattern, and a material with the same texture. For example, when forming the inner cases (1) and (2) in pink and the outer covers (3) and (4) in white, if the two tongue pieces (6) and (7) are formed in pink, the hinge portion (5) will become pink. Thus, even if the inner cases (1) and (2), and the outer covers (3) and (4) are formed with materials that have different visual qualities and feel, it is possible to prevent the deficiency of the hinge portion (5) becoming a striped pattern. Consequently, the inner cases (1) and (2), and the outer covers (3) and (4) can be formed with materials that have different visual qualities and feel, thus enabling product differentiation and design diversification.

In the above-described working example, the second tongue piece (7) is attached to the second outer cover (4), but it also may be attached to the first outer cover (3).

The invention claimed is:

1. A portable terminal comprising: a first cabinet comprising a display panel that displays information, and a second cabinet comprising operation keys are foldably connected by a hinge, and the two cabinets are electrically connected by a connection member arranged inside the hinge portion; wherein the first cabinet comprises a first inner case, and a first outer cover that covers a rear side of the first inner case, and the second cabinet comprises a second inner case, and a second outer cover that covers a rear side of the second inner case; wherein the hinge portion is constituted by putting together a first fitting portion provided at the first inner case, and a second fitting portion provided at the second inner case, and a cut-out for inserting the connection member is provided between the two fitting portions; wherein one of the fitting portions is provided with a first tube structure and a second tube structure that are spaced apart, a second covering structure that is substantially arc-shaped in profile extends from the first tube structure toward the second tube structure, and a back side of the second covering structure is open; and wherein the cut-out is covered by a first tongue piece that provides substantially a tube-shape when put together with the second covering structure, and a second tongue piece, having a press-in piece protruding from a lower side thereof, that is removably attached to one of the outer covers by inserting the press-in piece into a concave notch.

2. The portable terminal according to claim 1, wherein the first fitting portion, the second fitting portion, the first tongue piece, and the second tongue piece are made consistent and formed with a material that has an equivalent color and texture.

3. The portable terminal according to claim 1, wherein the first tongue piece comprises a claw piece that catches onto the first inner case, and a positioning protrusion that fits to the first inner case and restricts inadvertent turning of the second covering structure.

4. The portable terminal according to claim 1, wherein the first tongue piece and the second tongue piece appear outside of the hinge portion.

* * * * *